United States Patent
Terada et al.

(10) Patent No.: US 9,712,268 B2
(45) Date of Patent: Jul. 18, 2017

(54) LEVEL CONTROL APPARATUS AND STORAGE MEDIUM

(71) Applicant: YAMAHA CORPORATION, Hamamatsu-shi, Shizuoka-ken (JP)

(72) Inventors: Kotaro Terada, Hamamatsu (JP); Tomohiro Yamamoto, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/071,558

(22) Filed: Mar. 16, 2016

(65) Prior Publication Data
US 2016/0277134 A1    Sep. 22, 2016

(30) Foreign Application Priority Data
Mar. 17, 2015    (JP) ................. 2015-052855

(51) Int. Cl.
*H04B 1/00*    (2006.01)
*H04B 3/00*    (2006.01)
*H04H 40/54*    (2008.01)
*H04H 60/04*    (2008.01)
*G06F 3/16*    (2006.01)
*G06F 3/0484*    (2013.01)

(52) U.S. Cl.
CPC ......... *H04H 60/04* (2013.01); *G06F 3/04847* (2013.01); *G06F 3/162* (2013.01)

(58) Field of Classification Search
CPC ...... G06F 3/04847; G06F 3/162; H04H 60/04
USPC .......... 381/119; 700/94; 715/727, 716, 723, 715/728; 84/615, 625, 653, 660, 477
See application file for complete search history.

(56) References Cited

U.S. PATENT DOCUMENTS

| | | | | |
|---|---|---|---|---|
| 5,054,077 A | * | 10/1991 | Suzuki | H04H 60/04 381/107 |
| 5,940,521 A | * | 8/1999 | East | H04H 60/04 381/119 |
| 2004/0153879 A1 | * | 8/2004 | Fukutani | H04B 1/1027 714/48 |
| 2005/0054305 A1 | * | 3/2005 | Hagiwara | H04H 60/04 455/126 |
| 2006/0215857 A1 | | 9/2006 | Hirano | |
| 2008/0212794 A1 | * | 9/2008 | Ikeda | H04R 3/005 381/94.1 |
| 2009/0030704 A1 | * | 1/2009 | Takagi | H04S 3/006 704/503 |
| 2010/0302401 A1 | * | 12/2010 | Oku | H04N 5/23293 348/222.1 |

(Continued)

FOREIGN PATENT DOCUMENTS

JP    2006270886 A    10/2006

*Primary Examiner* — Khai N Nguyen
(74) *Attorney, Agent, or Firm* — Rossi, Kimms & McDowell LLP

(57) ABSTRACT

In a group level control section, a largest output level among those in channels belonging to a relevant group is selected automatically as a group level. By operating a control part of a channel level control section displayed on a basic screen, an output level of an input channel corresponding to the operated channel level control section can be controlled. Further, by operating a control part of a group level control section, output levels of the input channels belonging to the group can be collectively controlled with difference in levels among the input channels being maintained.

12 Claims, 11 Drawing Sheets

(56) References Cited

U.S. PATENT DOCUMENTS

| | | | |
|---|---|---|---|
| 2011/0228955 A1* | 9/2011 | Fujita | H04H 60/04 381/119 |
| 2012/0020497 A1* | 1/2012 | Okabayashi | H04H 60/04 381/119 |
| 2012/0201385 A1* | 8/2012 | Umeyama | G11B 20/10527 381/1 |

* cited by examiner

{Fig. 1}
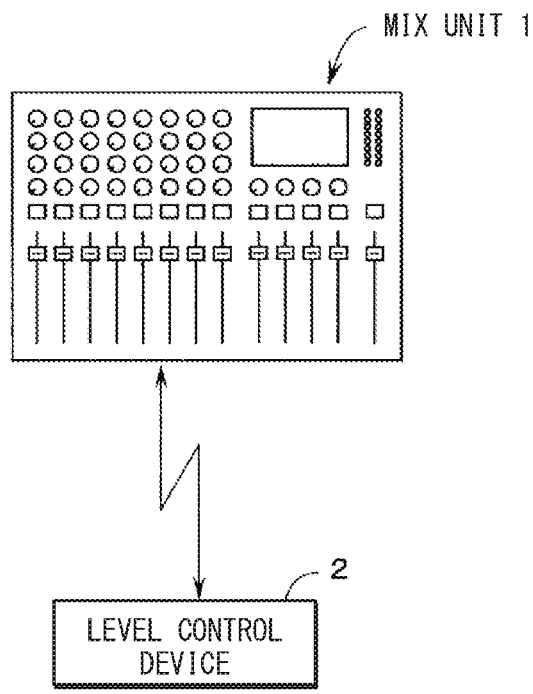
{Fig. 2}
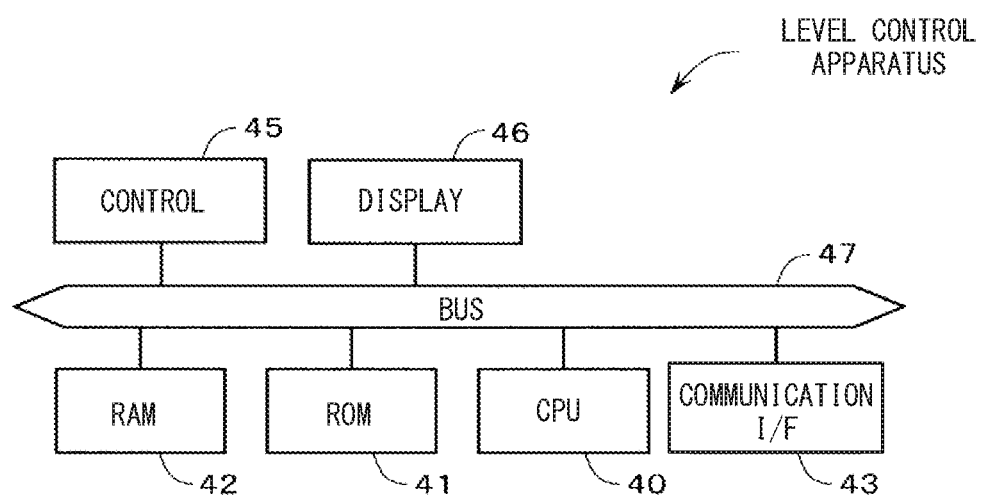

{Fig. 3}
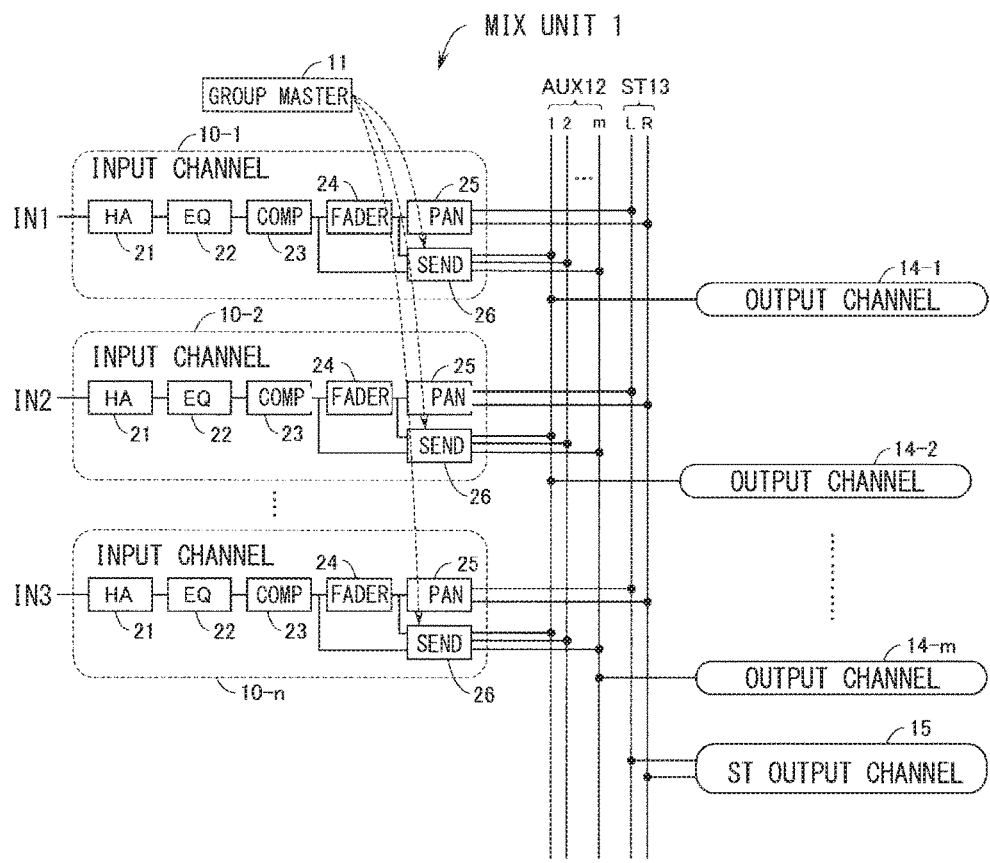

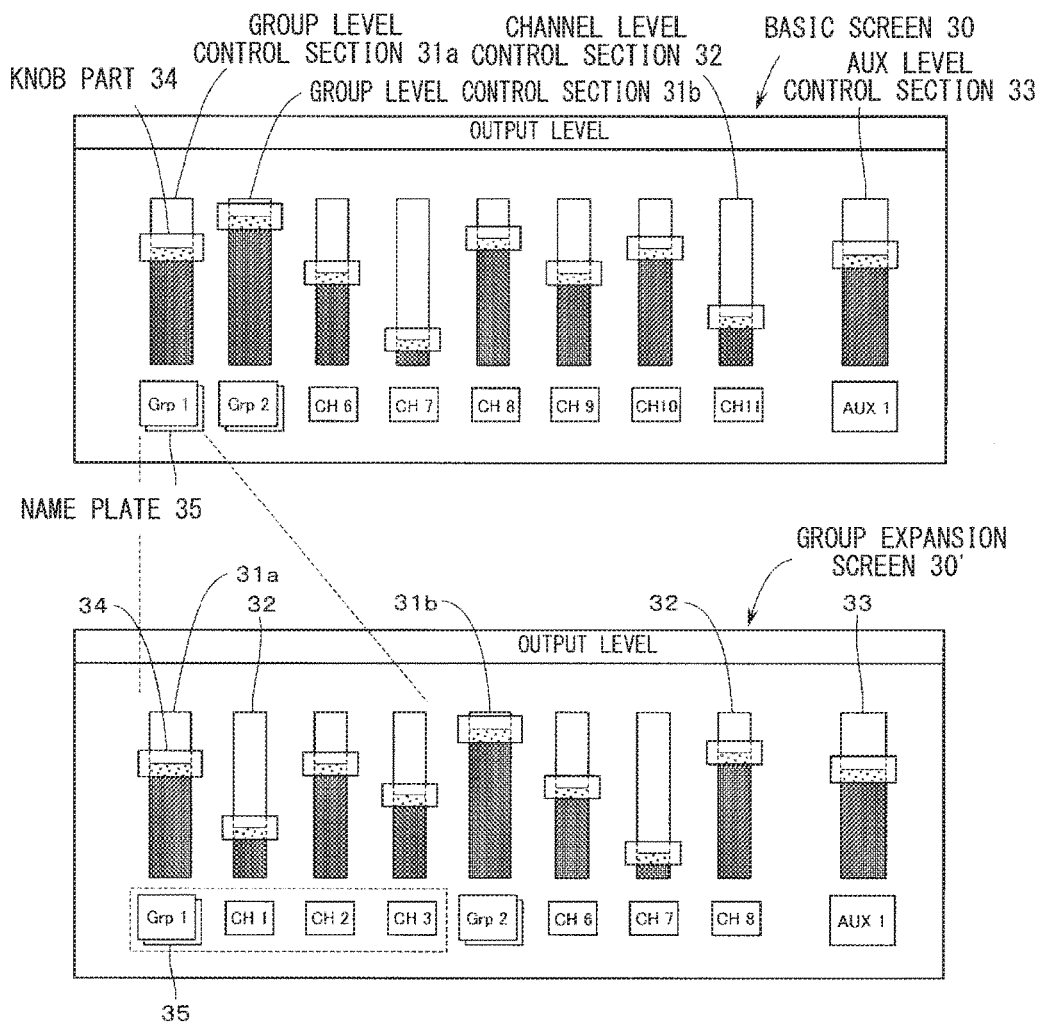
{Fig. 4}
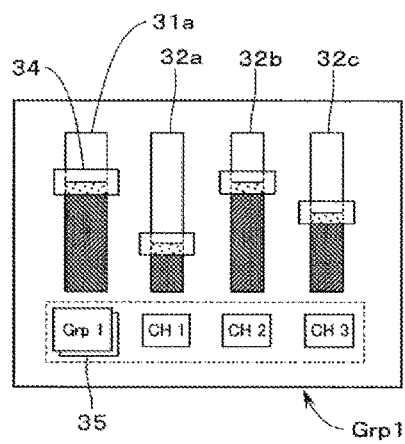
{Fig.5}

{Fig.6A}
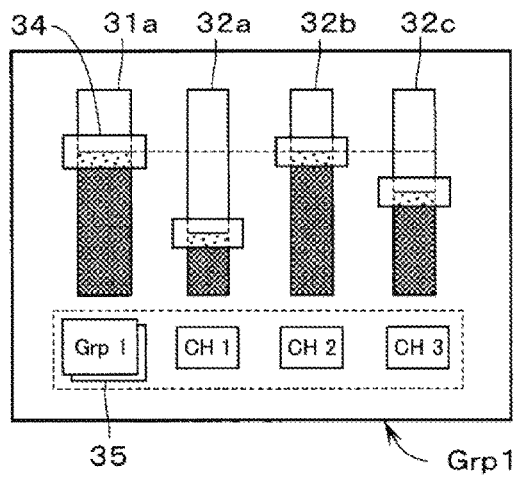
{Fig.6B}
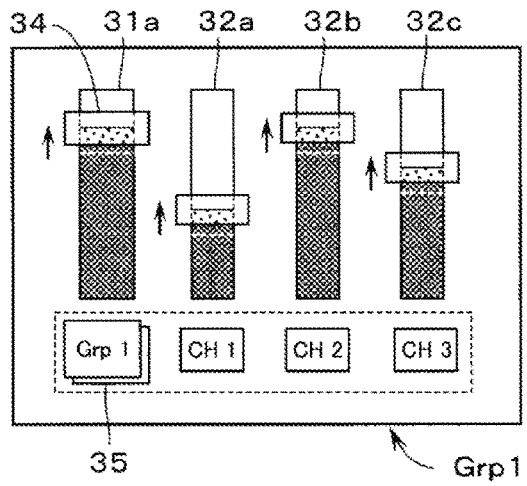
{Fig.6C}
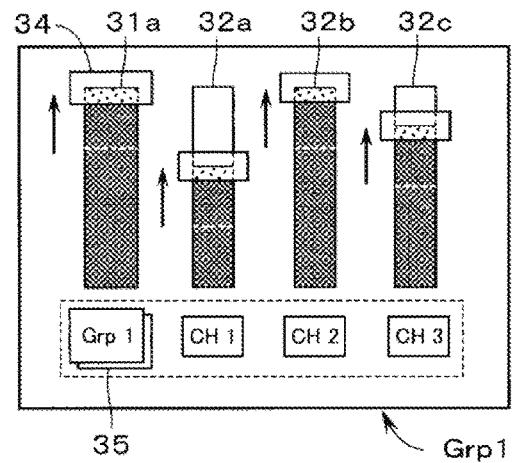

{Fig.6D}
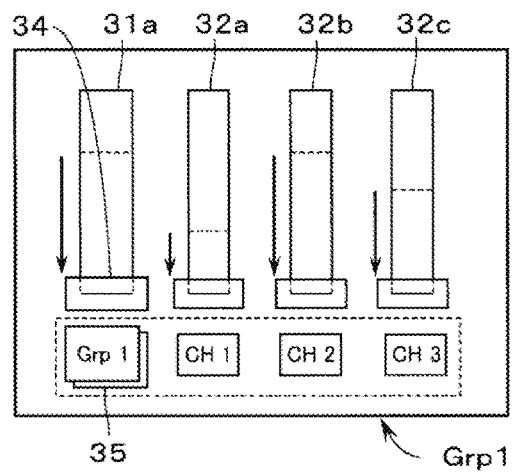
{Fig.6E}
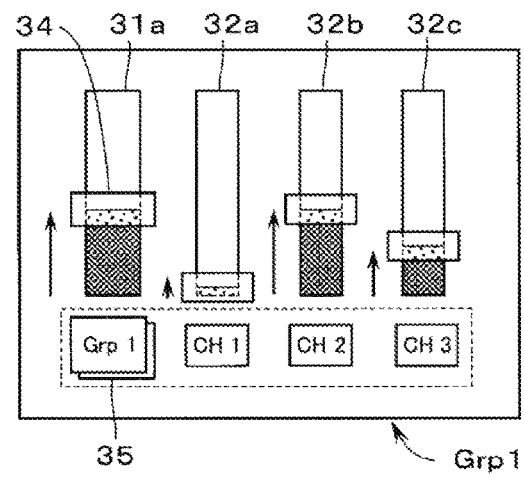
{Fig.6F}
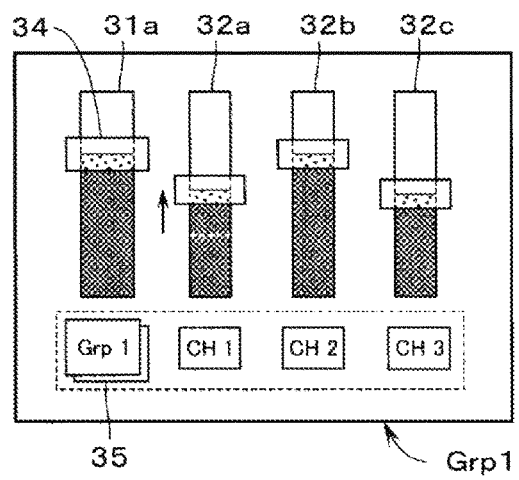
{Fig.6G}
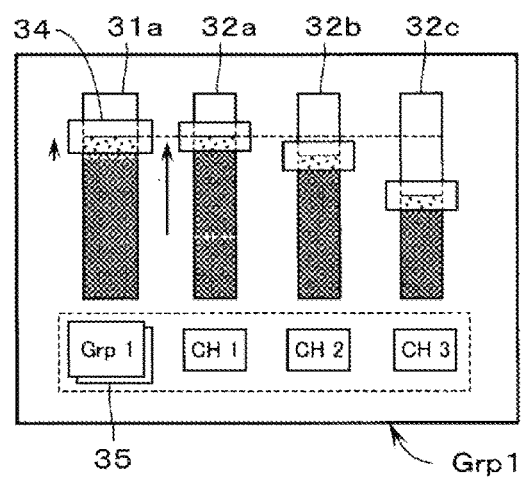

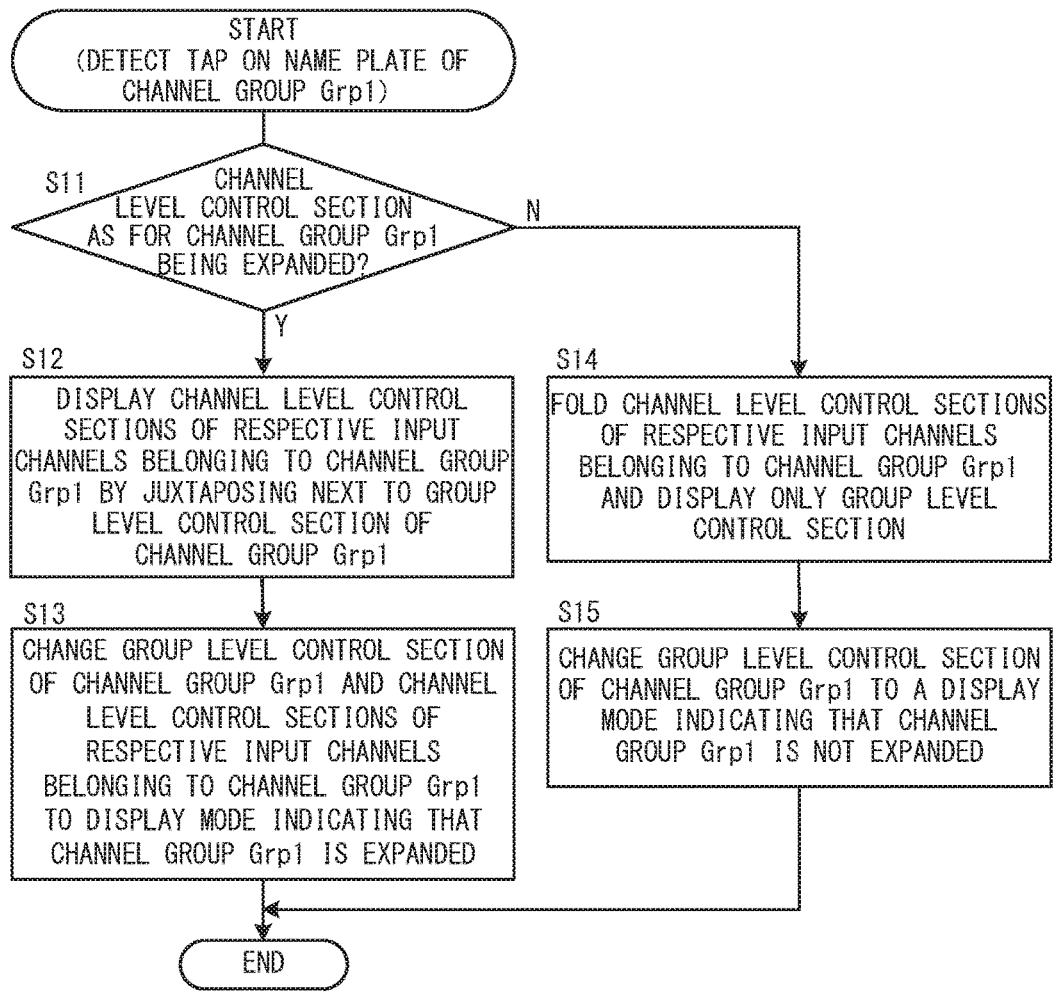

{Fig.7B}
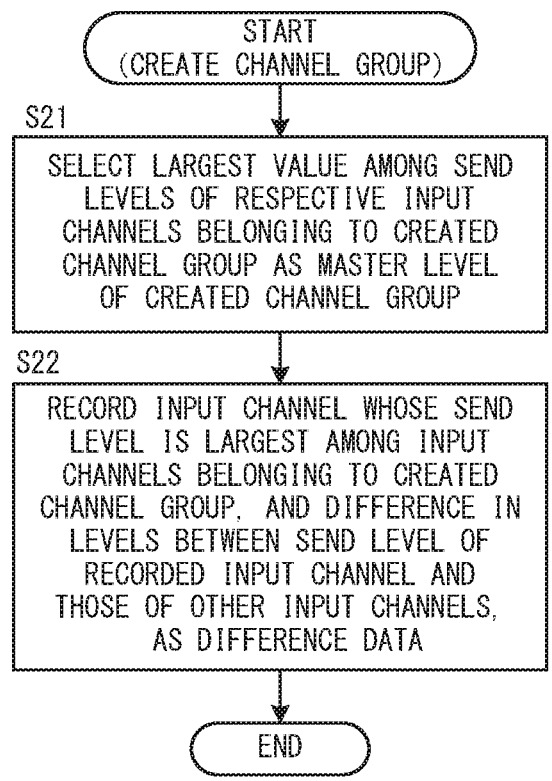

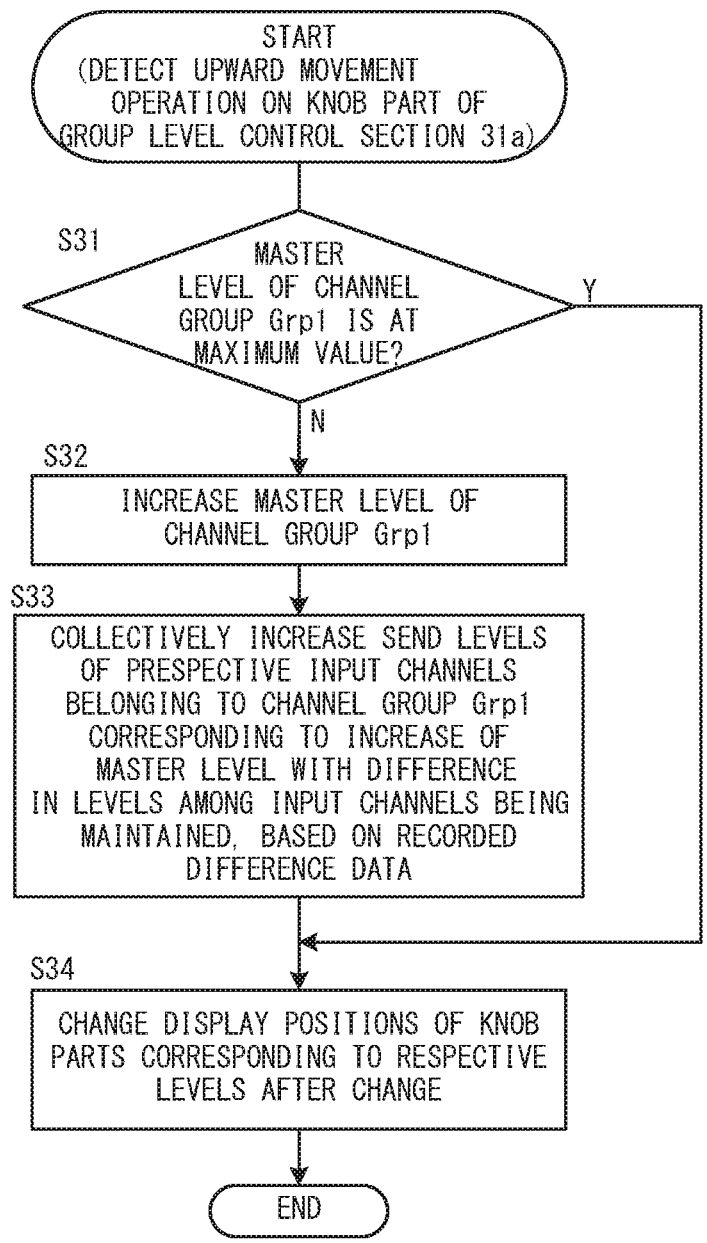

{Fig.7D}
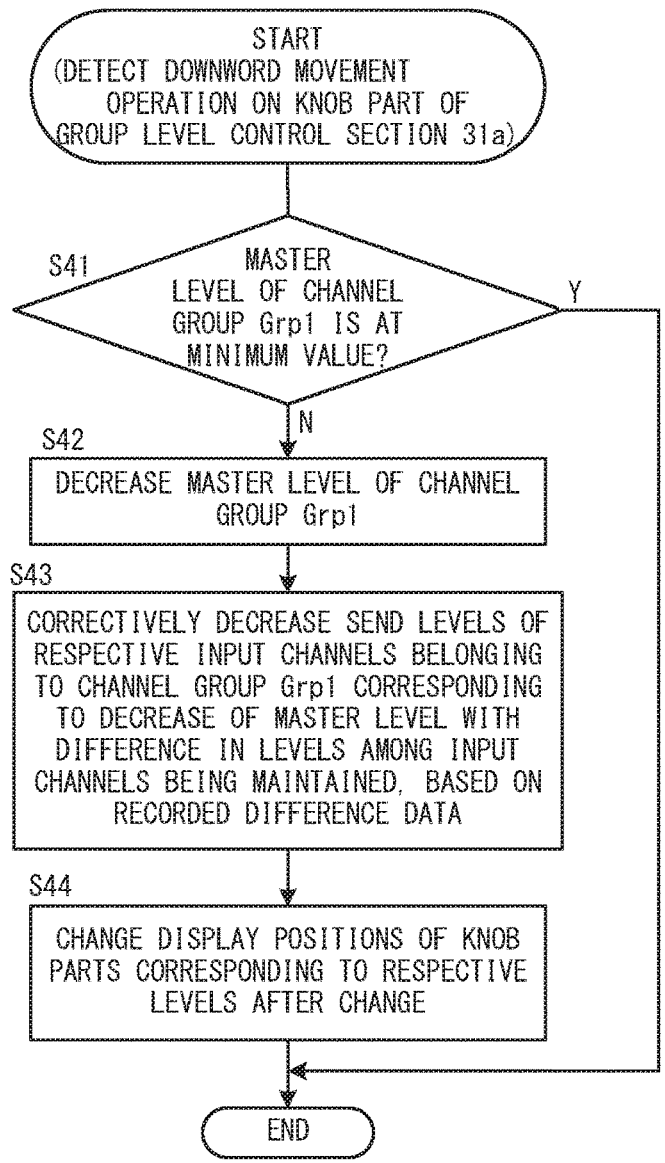

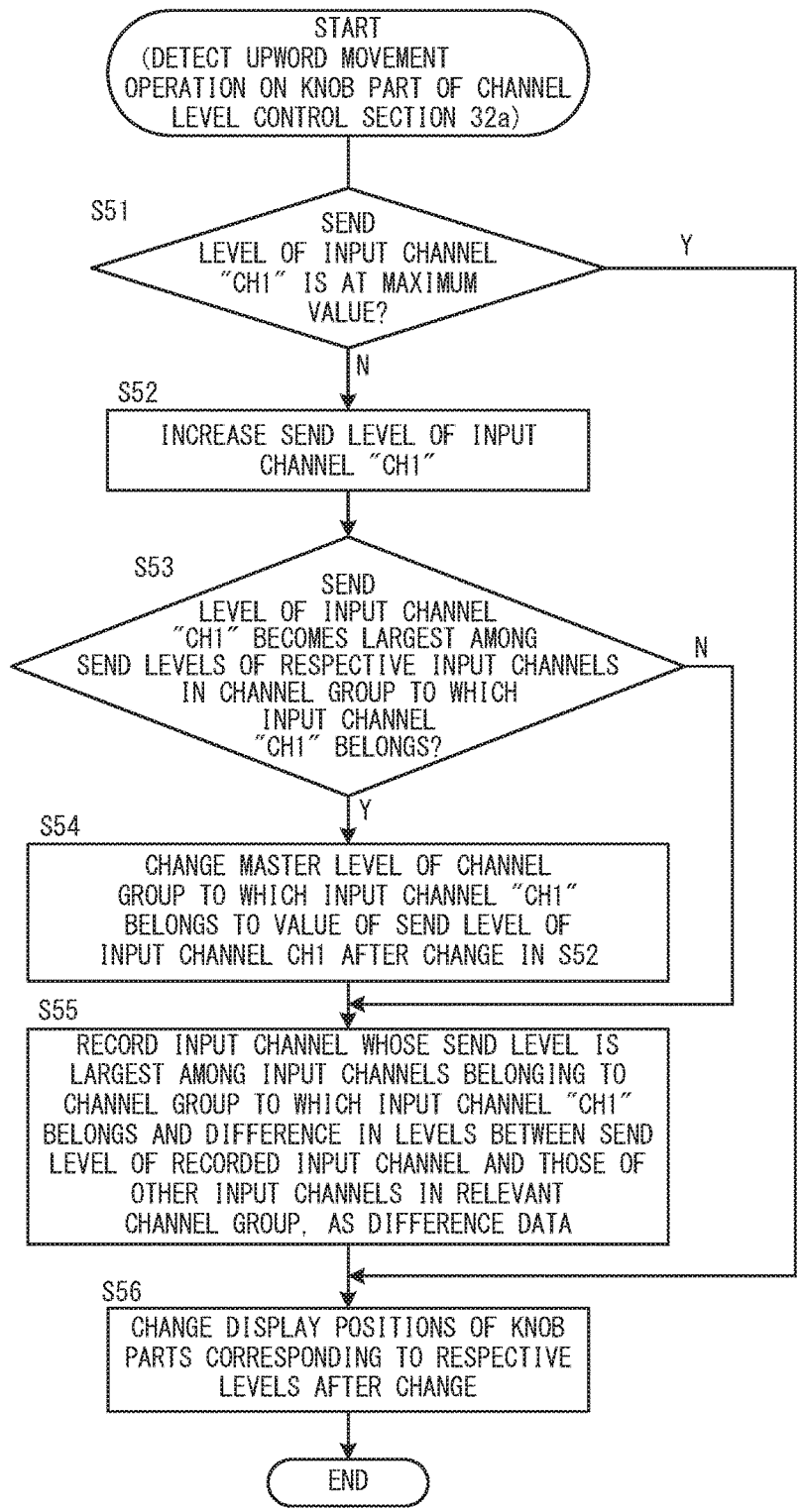

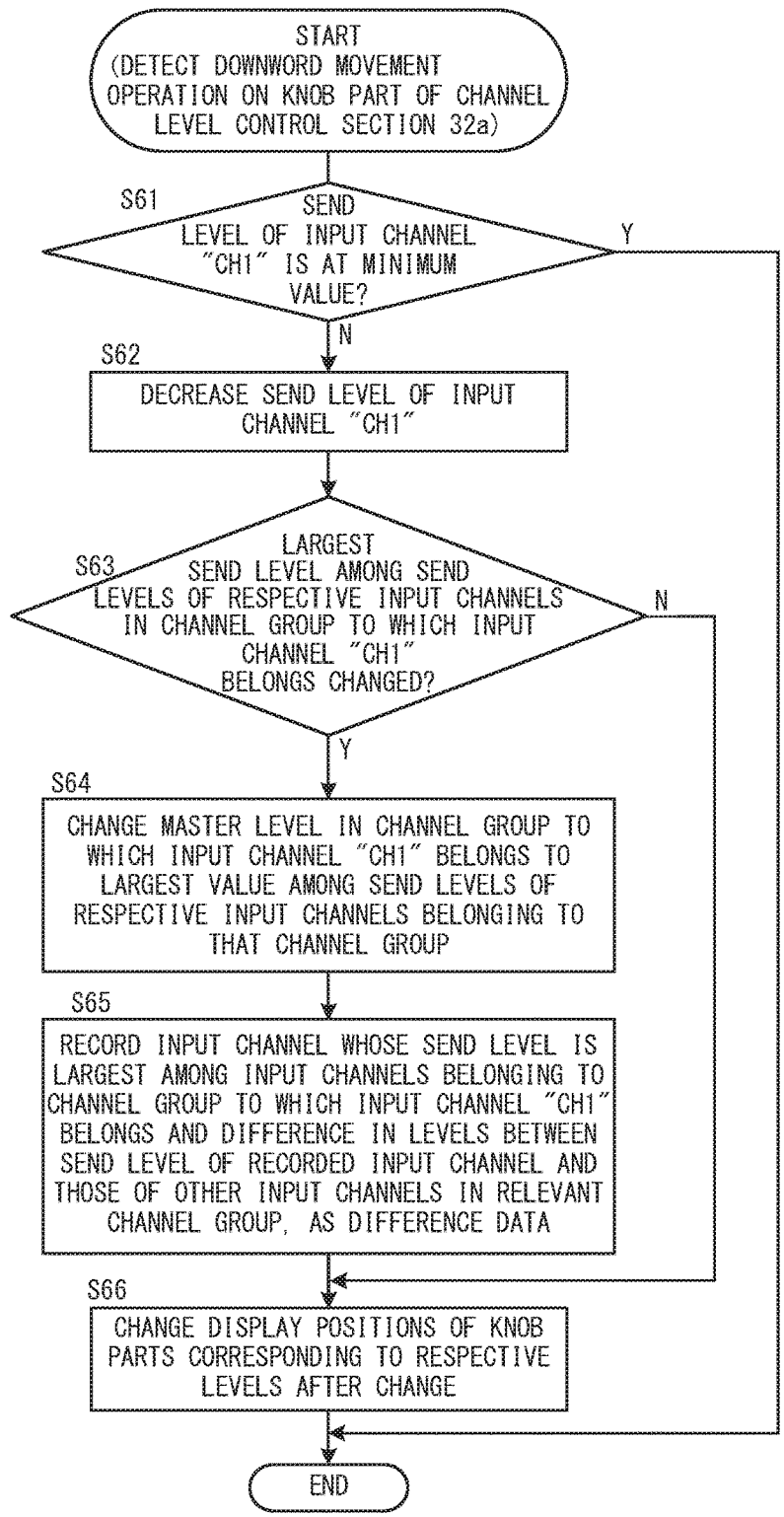

LEVEL CONTROL APPARATUS AND STORAGE MEDIUM

TECHNICAL FIELD

The invention relates to a level control apparatus capable of creating a group for combining a plurality of channels and a storage medium containing program instructions enabling a computer to function as such a level control apparatus.

BACKGROUND ART

It has been known that fader controls are grouped and interlocked with each other in a conventional mixer, so that the grouped state can be easily recognized visually and also a setting operation can be easily performed. In this case, fader controls of respective channels are provided, and a plurality of fader controls are grouped, allowing operating the fader controls in the same group in an interlocked manner by operating a fader control of a group master. Further, a window of a particular group is opened in response to a selecting operation by the user on a display screen, and images indicating the setting states as for respective fader controls belonging to the particular group are displayed on the window. In response to the user's operation on the images indicating the setting states of the respective fader controls belonging to the particular group, which are displayed on the window of the particular group, changing the setting state of each fader control belonging to the particular group has been conventionally performed (see PTL1).

Specifically, when performance sounds by a large musical instrument such as a drum set or a grand piano, or by a large number of people such as a chorus or strings (string orchestra) are collected, a plurality of microphones are set and their inputs are sent to a mixer, and a volume balance is achieved through the mixer. The volume balance is adjusted by operating fader controls of channels of the mixer which receives inputs from the microphones and/or the like. However, after achieving the balance, it is necessary to operate the fader controls of all associated channels at the same ratio in order to increase or decrease the total volume of target sound sources thereof. Accordingly, a "fader group processing" to assign desired associated channels to one group through is provided, enabling to collectively control the volumes of all channels belonging to the one group at the same ratio in an interlocked manner with a predetermined group master fader control provided in correspondence with the one group. Thus, the volume of the group can be controlled uniformly without losing the volume balance among the set group channels. That is, without losing sound field feelings or sound tones formed by the microphone setting, the volumes of parts of a drum, a piano, and so on can be controlled in an interlocked manner. This group is called a DCA group for example in the mixer.

CITATION LIST

Patent Literature

{PTL1} JP 2006-270886 A

SUMMARY OF INVENTION

Technical Problem

In the conventional mixer or the like, a group of fader controls of respective channels can be created, and the levels of the channels belonging to the group can be collectively controlled by operating the fader control of the group master.

In this manner, by creating a group constituted of a plurality of channels, creating a group level controller and controlling the group level controller, the levels of respective channels belonging to the group can be controlled. However, generally, the control of the group level controller has a value unique to the control, and thus it is difficult to grasp the states of the levels of the respective channels belonging to the group by just seeing an image of a setting state of the group level controller displayed on the display screen at the time of operation. There has also been a problem that it is difficult to see how the levels of the respective channels belonging to the group change by operating the control of the group level controller.

Accordingly, it is an object of the invention to enable for a user of a level controlling apparatus to grasp approximate levels of respective channels belonging to a group by looking at an image of a setting state of a group level controller displayed on a display screen, and to grasp approximate changes of the levels of respective channels belonging to the group when operating the control of the group level controller.

Solution to Problem

In order to achieve the above-described object, a level control apparatus according to the invention is a level control apparatus comprising: a channel level controller provided for each channel with a control part for displaying an output level of a corresponding channel by a position of the control part; a group level controller provided with a control part for displaying a group level of a group constituted of a plurality of the channels by a position of the control part; and a calculator for calculating difference among the output levels of the plurality of channels belonging to the group, wherein the group level controller selects a largest output level among output levels of the plurality of the channels belonging to the group as the group level, the channel level controller controls, according to an operation of the control part of the channel level controller, the output level of the channel corresponding to the channel level controller, and the group level controller collectively controls, according to an operation of the control part of the channel level controller, output levels of the plurality of the channels belonging to the group with the difference of the output levels among the channels calculated by the calculator being maintained.

In such a level control apparatus, it is conceivable that the level control apparatus further comprises a display controller for displaying the control part of the channel level controller for each channel and the control part of the group level controller, on a display, the channel level controller controls the output level according to the operation of the control part of the channel level controller displayed on the display, and the group level controller collectively controls the output levels according to the operation of the control part of the channel level controller displayed on the display.

Advantageous Effects of Invention

In the level control apparatus of the present invention, a largest output level among output levels of the plurality of the channels belonging to the group is automatically selected as a group level. Accordingly, the user can grasp approximate levels of respective channels belonging to a group by looking at an image of a setting state of a group level controller displayed on a display screen, and grasp approximate changes of the levels of respective channels belonging to the group when operating the control of the group level controller.

BRIEF DESCRIPTION OF DRAWINGS

FIG. 1 is a diagram illustrating a configuration in which a level control apparatus of an embodiment of the invention is connected to a mixer.

FIG. 2 is a block diagram illustrating a hardware configuration of the level control apparatus of an embodiment of the invention.

FIG. 3 is a diagram illustrating a main configuration of the mixer.

FIG. 4 is a diagram illustrating an example of a basic screen and a Grp expansion screen displayed by the level control apparatus illustrated in FIG. 2.

FIG. 5 is a diagram illustrating an expansion screen of a unit Grp in the Grp expansion screen displayed by the level control apparatus illustrated in FIG. 2.

FIG. 6A is a diagram for explaining modes of operation in the expansion screen of the unit Grp.

FIG. 6B is another diagram for explaining modes of operation in the expansion screen of the unit Grp.

FIG. 6C is still another diagram for explaining modes of operation in the expansion screen of the unit Grp.

FIG. 6D is still another diagram for explaining modes of operation in the expansion screen of the unit Grp.

FIG. 6E is still another diagram for explaining modes of operation in the expansion screen of the unit Grp.

FIG. 6F is still another diagram for explaining modes of operation in the expansion screen of the unit Grp.

FIG. 6G is still another diagram for explaining modes of operation in the expansion screen of the unit Grp.

FIG. 7A is a flowchart illustrating processing executed by a CPU of the level control apparatus illustrated in FIG. 2.

FIG. 7B is a flowchart illustrating another processing executed by the same CPU.

FIG. 7C is a flowchart illustrating still another processing executed by the same CPU.

FIG. 7D is a flowchart illustrating still another processing executed by the same CPU.

FIG. 7E is a flowchart illustrating still another processing executed by the same CPU.

FIG. 7F is a flowchart illustrating still another processing executed by the same CPU.

DESCRIPTION OF EMBODIMENTS

FIG. 1 illustrates a configuration in which a level control apparatus 2 of an embodiment of the invention is connected to a mixer. In FIG. 1, the mixer is illustrated as a MIX unit 1, and the MIX unit 1 and the level control apparatus 2 have communication interfaces and operating programs thereof for enabling mutual communication. The level control apparatus 2 can be connected to the MIX unit 1 wirelessly or via a wired communication network, and the level control apparatus 2 can be connected to the MIX unit 1 by "IrDA" as an infrared communication standard, "Bluetooth", USB (Universal Serial Bus), or the like. In the MIX unit 1, audio signals from a plurality of microphones or musical instruments, and/or the like are inputted to a plurality of input channels, and an audio signal obtained by mixing the inputted audio signals is outputted. While the level control apparatus 2 is connected to the MIX unit 1, the MIX unit 1 sends channel information, such as set values of volume levels of all the input channels, to the level control apparatus 2. The level control apparatus 2 has a touch panel display, and by displaying on the touch panel display an image of a GUI (Graphical User Interface) for level control using a display menu, a user can control a send level which is an output level from each input channel of the MIX unit 1 to a mixing bus through the GUI. In the GUI, a plurality of level controls simulating a fader having a knob are displayed based on the channel information sent from the MIX unit 1, and each level control indicates the send level by the position of the knob. When the position of the knob of the level control is operated on the touch panel display by the user, the level control apparatus 2 controls the value of the send level from the input channel assigned to the operated level controller to the mixing bus according to the position of the knob operated. The level control apparatus 2 sends the controlled value of the send level to the MIX unit 1 to reflect the value in the signal processing in the MIX unit 1. Accordingly, the level control apparatus 2 functions as a remote controller capable of controlling the send level from each input channel to the mixing bus of the MIX unit 1.

FIG. 2 is a block diagram illustrating a hardware configuration of the level control apparatus 2 of an embodiment of the invention.

As illustrated in FIG. 2, a CPU (Central Processing Unit) 40 in the level control apparatus 2 executes management program (OS: Operating System), and thereby controlling overall operation of the level control apparatus 2 on the OS. The level control apparatus 2 has a non-volatile ROM (Read Only Memory) 41 storing an operating program and various data of the level control apparatus 2 and a RAM (Random Access Memory) 42 storing various data and used as a work area for the CPU 40. Further, a communication I/F 43 is a communication interface for performing mutual communication between the level control apparatus 2 and the MIX unit 1, and is an interface such as a USB or Ethernet (trademark). The level control apparatus 2 transmits information corresponding to operations on the level controller of the level control apparatus 2 to the MIX unit 1, and receives channel information, such as send levels of all the input channels, from the MIX unit 1, via the communication I/F 43. Moreover, a display 46 is a display having the touch panel display for displaying various information according to control by the CPU 40, and can be constituted of, for example, a liquid crystal panel (LCD) or the like. The display 46 has a sufficient size for displaying the above-described GUI screen. A control 45 is a touch panel constituting the touch panel display and allowing a touch operation.

FIG. 3 illustrates a main configuration of the mixer to which the level control apparatus 2 according to the present invention is connected.

In FIG. 3, the mixer is illustrated as a MIX unit 1, and includes input channels 10-1, 10-2, . . . , 10-n, where n represents the number of the input channels. An audio signal IN1 is inputted to the first input channel 10-1, an audio signal IN2 is inputted to the second input channel 10-2, . . . , and an audio signal INn is inputted to the n-th input channel 10-n. The input channels 10-1 to 10-n have the same configuration, in which a head amplifier (HA) 21, an equalizer (EQ) 22, a compressor (COMP) 23, a fader (FADER) 24, and a pan (PAN) 25 are cascade connected, and have a send (SEND) 26. The head amplifier 21 is an amplifier for amplifying the inputted audio signal. The equalizer 22 is an equalizer for adjusting frequency characteristics of the inputted audio signal, and is configured to vary frequency characteristics of each band of, for example, four bands HI, MID HI, LOW MID, LOW. The compressor 23 is configured to narrow the dynamic range of the inputted audio signal so as to prevent saturation of the inputted audio signal. The fader 24 is a level controller for controlling the level of the inputted audio signal according to a level parameter controlled using a fader control such as a moving fader. The pan 25 is configures to adjust leftward-rightward orientation of the stereo signal sent from the input channel 10 (the reference numeral "10" is used when it is not necessary to indicate a specific channel) to two systems of L and R stereo (ST) buses 13. Moreover, to the send 26, audio signals are supplied from a pre-fader extraction point before the fader 24 and a post-fader extraction point after the fader 24, and the send 26 controls the send level of the audio signal sent to each of a plurality (m pieces) of mixing (AUX) buses 12. In this case, the send 26 selects the audio signal from the pre-fader signal and the post-fader signal, and controls the send level of the selected audio signal before sending the signal to the AUX bus 12, for each of the m pieces of AUX buses 12.

In the MIX unit 1, respective audio signals from the input channels 10-1 to 10-n can be supplied to and mixed in any piece of the m pieces of AUX buses 12, and can also be supplied to and mixed in the ST buses 13. Then, the audio signals mixed in the m pieces of AUX buses 12 are outputted to respective output channels 14-1, 14-2, . . . , 14-m (where the number of the output channels is m). Further, stereo signals mixed in the ST buses 13 are outputted to a stereo output channel 15. In the output channels 14-1, 14-2, . . . , 14-m and the stereo output channel 15, an equalizer, a compressor, a fader, and so on are provided by cascade connection, and frequency characteristics and levels of audio signals to be outputted are controlled.

In the level control apparatus 2, the send levels of audio signals from the input channels 10-1 to 10-n to be supplied to the respective buses of the m pieces of AUX buses 12 can be remote controlled. In the level control apparatus 2, the user can create a virtual channel group constituted of arbitrary plurality of input channels in the level control apparatus 2 for remote controlling the send level, and the send level of the send 26 of the input channel 10 belonging to the channel group can be collectively controlled in an interlocked manner with difference in levels among the input channels being maintained using a group master 11 provided in correspondence with the channel group.

Specifically, when a performance with a large musical instrument such as a drum set or a grand piano, or by a large number of people such as a chorus or strings (string orchestra), is given, providing the level control apparatus 2 for each performer enables him or her to monitor his or her own performance sounds, which will be a sound source. For example, the performer of the drum set plays musical instruments such as a kick, a tom, a snare drum, and a cymbal. The performance sounds of the respective musical instruments are collected through respective dedicated microphones, and are inputted as some of audio signals IN1 to INn to the input channels 10-1 to 10-n. In this case, when the performance sounds of the drum set are inputted to the first to third input channels 10-1 to 10-3, the performer controls the volume balance of respective performance sounds in the input channels 10-1 to 10-3 by operating respective fader controls of the input channels 10-1 to 10-3, to thereby adjust the volume balance among the performance sounds by the faders 24. Then, by controlling the respective send levels of the audio signals from the input channels 10-1 to 10-3 using the sends 26 of the input channels 10-1 to 10-3 and supplying the audio signals to the first "AUX1" bus of the AUX buses 12, the performance sounds of the drum set with an adjusted volume balance is supplied at a desired level to the first bus of the AUX bus 12. The performer of the drum set can monitor the performance sounds of the drum set with a set volume balance by hearing the audio signal outputted from the output channel 14-1, which outputs the audio signal mixed in the first bus of the AUX bus 12. Other performers can also monitor the performance sounds in a similar way, that is, performing level control by operating the fader controls of the input channel units 10 to which their own performance sounds are inputted, adjusting the volume balance among the inputted audio signals, controlling the send levels by the sends 26 to supply the adjusted audio signals to an i-th bus of the AUX bus 12 assigned to the part of this performer, and monitoring the audio signal outputted from the output channel 14-i, which outputs the audio signal mixed in the i-th bus.

The volume balance among sound sources of different musical instruments or performers can be controlled by the fader 24 or the send 26 of each input channel 10. However, for increasing or decreasing the total volume of a plurality of sound sources with the volume balance among the plurality of sound sources being maintained, it is necessary to operate the fader controls for the faders 24 or the controls for the sends 26 of the relevant plurality of input channels 10 at the same ratio with difference in levels among the set input channels being maintained, which is unrealistic. Accordingly, in the level control apparatus 2, a virtual channel group constituted of input channels relevant to a plurality of sound sources can be created, and a virtual group level controller corresponded to the channel group can be further created. By operating a control for the group level controller of the level control apparatus 2, the send levels of all the input channels belonging to the channel group corresponded to the group level controller are collectively increased or decreased with the difference in levels among the input channels being maintained. The channel group can be constituted freely of arbitrary plurality of input channels on the level control apparatus 2 side without involving the mixer unlike the above-described DCA group, and the level control apparatus 2 does not send information such as a created channel group or a parameter value of the group level controller to the MIX unit 1. The channel group and the group level controller are completed in the level control apparatus 2 which created the channel group. When a plurality of level control apparatuses 2 for every performer or the like are connected to the MIX unit 1, each one of the level control apparatuses 2 can create a channel group constituted of arbitrary plurality of input channels, and by the group level controller created simultaneously, the send levels of input channels belonging to the created channel group can be collectively increased or decreased with the difference in levels among the input channels being maintained. In FIG. 3, the group level controller is illustrated as a group master 11, and by the group master 11, the send level of the send 26 of the input channel 10 belonging to the group corresponded to the group master 11 can be collectively increased or decreased with the difference in levels among the input channels being maintained. In FIG. 3, arrow lines from the group master 11 to the sends 26 being depicted as dashed lines indicate that only the send levels of sends 26 of the input channel 10 belonging to the group corresponding to the group master 11 are increased or decreased.

FIG. 4 illustrates a configuration of a basic screen 30 and a group expansion screen 30' of the GUI displayed on the display 46 of the level control apparatus 2.

In the case where the user creates two virtual channel groups Grp1 and Grp2 in the level control apparatus 2, as illustrated in the basic screen 30 of FIG. 4, a group level control section 31a corresponded to the channel group Grp1, which is labeled as "Grp1" on a name plate 35, and a group level control section 31b corresponded to the channel group Grp2, which is labeled as "Grp2" on another name plate 35, are created and displayed. Each of the group level control sections 31a, 31b is an image simulating a fader having a knob part 34 as a control portion thereof, indicating a set level by the length of a rectangular bar displayed in gray (up to a middle line of the knob part 34). The knob part 34 is illustrated in the figure translucently, but it is not limited to translucency and may be opaque. As will be described later, three input channels 10-1 to 10-3 respectively named as "CH1", "CH2", and "CH3" belong to the channel group Grp1, and the send levels of the sends 26 in the input channels 10-1 to 10-3 can be collectively increased or decreased with the difference in levels among the input channels being maintained by operating the knob part 34 of the group level control section 31a. In this case, by performing an operation to touch the knob part 34 of the group level control section 31a and change its position upward or downward, the send levels of the sends 26 in the input channels 10-1 to 10-3 are controlled at the same ratio corresponding to the position of the knob part 34 after being operated. Further, two input channels 10-4 and 10-5 respectively named as "CH4" and "CH5" belong to the channel group Grp2, and the send levels of the sends 26 in the input channels 10-4, 10-5 can be collectively increased or decreased with the difference in levels among the input channels being maintained by performing an operation to touch the knob part 34 of the group level control section 31b and change its position upward or downward, similarly to the above.

Further, by juxtaposing in a lateral direction with the group level control sections 31a, 31b, images of channel level control section 32 for controlling the send levels of input channels 10 not belonging to the channel groups Grp1 or Grp2 are displayed. In FIG. 4, the channel level control sections 32 of six input channels 10-6 to 10-11 respectively named as "CH6" to "CH11" are displayed as labeled on name plates 35. Also each of the channel level control sections 32 is an image simulating a fader having a knob part 34 as a control portion thereof, indicating a set level by the length of a rectangular bar displayed in gray (up to a middle line of the knob part 34). The knob part 34 is illustrated in the figure translucently, but it is not limited to translucency and may be opaque. On each channel level control section 32, by performing an operation to touch the knob part 34 of the channel level control section 32 and change its position similarly to the above, the send level of the send 26 of the input channel 10 corresponding to the operated channel level control section 32 can be controlled.

Moreover, an image of an AUX level control section 33 is displayed by juxtaposing with the channel level control section 32. The AUX level control section 33 is for controlling the output level of the output channel 14-1 from which the audio signal mixed in the first "AUX1" bus of the AUX bus 12 as labeled on a name plate 35 is outputted. The AUX level control section 33 is also an image simulating a fader having a knob part 34 as a control portion thereof, indicating a set level by the length of a rectangular bar displayed in gray (up to a middle line of the knob part 34). The knob part 34 is illustrated in the figure translucently, but it is not limited to translucency and may be opaque. On the AUX level control section 33, by performing an operation to touch the knob part 34 of the AUX level control section 33 and change its position similarly to the above, the output level of the output channel 14-1 corresponding to the AUX level control section 33 can be controlled.

When the name plate 35 of Grp1 illustrated in FIG. 4 is tapped, the channel group Grp1 is expanded and a group expansion screen 30' illustrated is displayed on the display 46. In the group expansion screen 30', the channel group Grp1 is expanded, displaying images of channel level control sections 32 for the input channels of "CH1", "CH2", and "CH3", for controlling send levels of respective sends 26 of all of the input channels belonging to the channel group Grp1, by juxtaposing next to the group level control section 31a. In this case, the channel level control sections 32 of the input channels of "CH1", "CH2", and "CH3" belong to a lower layer of the group level control section 31a. However, the group level control section 31a and the channel level control sections 32 are aligned in the same horizontal line on the same screen. The group expansion screen 30' is in a display mode illustrating that the channel group Grp1 is expanded. For example, as illustrated, a rectangular frame of dashed line surrounding the name plates 35 of "Grp1", "CH1", "CH2", and "CH3" is displayed, or their display colors may be changed. By performing an operation to touch the knob part 34 of the group level control section 31a of "Grp1" and change its position in the Grp expansion screen 30', the send levels of the sends 26 in the input channels 10-1 to 10-3 are collectively increased or decreased with the difference in levels among the input channels being maintained, and display positions of the knob parts 34 of the channel level control sections 32 of "CH1", "CH2", and "CH3" are changed corresponding to the increase or decrease of the send levels. Further, when an operation to touch the knob part 34 of the channel level control section 32 of "CH1" and change its position is performed, only the send level of the send 26 in the input channel 10-1 can be increased or decreased, and the same applies to the channel level control sections 32 of "CH2", and "CH3".

Further, although not illustrated, when the name plate 35 of the group level control section 31b of the channel group Grp2 is tapped, the channel group Grp2 is expanded and images of the channel level control sections 32 of "CH4" and "CH5" for controlling the send levels of respective sends 26 of all of the input channels belonging to the channel group Grp2 are displayed by juxtaposing next to the group level control section 31b. When an operation to touch the knob part 34 of the group level control section 31b of the expanded the channel group Grp2 and change its position is performed, the send levels of the sends 26 in the input channels 10-4 and 10-5 are collectively increased or decreased with the difference in levels among the input channels being maintained, and display positions of the knob parts 34 of the channel level control sections 32 of "CH4" and "CH5" are changed corresponding to the increase or decrease of the send levels. Further, when an operation to touch the knob part 34 of the channel level control section 32 of "CH4" or "CH5" and change its position is performed, only the send level of the send 26 in the corresponding input channel 10 can be increased or decreased.

Note that in the basic screen 30 and the group expansion screen 30' illustrated in FIG. 4, by touching the screen and scrolling it in a lateral direction, the channel level control sections 32 for the input channels after "CH11" can be displayed. Further, by changing the display setting of images of the knob parts 34 of the group level control sections 31a, 31b and the channel level control sections 32, the images of the knob parts 34 can be set to non-display. In the case of the non-display, level control can be performed by touching the top portion of the rectangular bar displayed in gray and moving it upward or downward. Further, the expansion of a channel group by tapping the name plate 35 is a toggling operation. When the name plate 35 of an expanded group level control section is tapped, the channel level control sections 32 of the expanded channel group is folded and only the group level control section is displayed.

FIG. 7A illustrates a flowchart of processing executed by the CPU 40 when a tap on the name plate 35 of the channel group Grp1 is detected, so as to realize the above-described display.

In the processing of FIG. 7A, the CPU 40 determines whether the channel level control section 32 is expanded or not as for the channel group Grp1 (S11). Then, when it is expanded, the channel level control sections 32 (32a to 32c; see FIG. 5) of respective input channels belonging to the channel group Grp1 are displayed by juxtaposing next to the group level control section 31a of the channel group Grp1 (S12). Further, the CPU 40 changes the group level control section 31a of the channel group Grp1 and the channel level control section 32a to 32c of the respective input channels belonging to the channel group Grp1 to a display mode indicating that the channel group Grp1 is expanded (S13), and then ends the processing.

Further, when it is not expanded in step S11, the CPU 40 folds the channel level control sections 32 (32a to 32c; see FIG. 5) of respective input channels belonging to the channel group Grp1 and displays only the group level control section 31a (S14). Moreover, the CPU 40 changes the group level control section 31a of the channel group Grp1 to a display mode indicating that the channel group Grp1 is not expanded (S15), and then ends the processing.

Next, modes of operation as for the channel groups Grp1 and Grp2 will be described, but here for simplicity of description, only a configuration as for the channel group Grp1 illustrated in FIG. 5 is extracted from the group expansion screen 30' illustrated in FIG. 4, and the description will be given with reference to FIG. 6A to FIG. 6G illustrating the extracted configuration.

In the configuration of the group level control section 31a of the channel group Grp1 illustrated in FIG. 5, the channel level control section 32a of the first input channel 10-1 named as "CH1", the channel level control section 32b of the second input channel 10-2 named as "CH2", and the channel level control section 32c of the third input channel 10-3 named as "CH3", which belong to the channel group Grp1, respectively display set send levels by the lengths of rectangular bars displayed in gray (up to a middle line of the knob part 34).

FIG. 6A is a diagram for describing a master level, which is considered to be a group level, set for the channel group Grp1 corresponding to the illustrated group level control section 31a. The largest send level among those for the first to third input channels 10-1 ("CH1") to 10-3 ("CH3") belonging to the channel group Grp1 is selected automatically as the master level of the channel group Grp1. In the illustrated case, the send level of the second input channel 10-2 ("CH2") is the largest, and thus the send level of the second input channel 10-2 set by the channel level control section 32b is selected as the master level of the channel group Grp1 and displayed in the group level control section 31a. Note that when the channel group is created or when the largest send level among the input channels belonging to the channel group is changed, the level control apparatus 2 handles the event as a trigger, and calculates difference in levels between the largest send level and the send levels of other input channels belonging to the same channel group, respectively, and records the difference as difference data.

FIG. 7B illustrates a flowchart of processing executed by the CPU 40 when the channel group is created.

In the processing of FIG. 7B, the CPU 40 selects the largest value among send levels of respective input channels belonging to the created channel group as the master level of the created channel group (S21). Further, the CPU 40 records the input channel whose send level is the largest among the input channels belonging to the created channel group and the difference in levels between the send level of this input channel and those of other input channels belonging to the created channel group, as difference data (S22), and end the processing.

Further, FIG. 6B is a diagram illustrating changes of send levels of the first to third input channels 10-1 ("CH1") to 10-3 ("CH3") belonging to the channel group Grp1 in the case where the knob part 34 of the group level control section 31a is touched and its position is moved upward. As illustrated in FIG. 6B, the master level of the channel group Grp1 increases from the position of a white dashed line. Corresponding to this increase, the send levels of the first to third input channels "CH1" to "CH3" respectively indicated by the positions of white dashed lines in the channel level control sections 32a to 32c, which has been respectively set for the input channels "CH1" to "CH3", are collectively increased with the difference in levels among the input channels being maintained based on the recorded difference data. Accompanying this, the display positions of the knob parts 34 of the respective channel level control sections 32a, 32b, 32c of the input channels "CH1", "CH2", "CH3" are changed to correspond to the increased send levels.

FIG. 6C is a diagram illustrating changes of send levels of the first to third input channels "CH1" to "CH3" belonging to the channel group Grp1 in the case where the knob part 34 of the group level control section 31a is touched and its position is moved upward to the maximum value. As illustrated in FIG. 6C, the master level of the channel group Grp1 is increased to the maximum value from the position of a white dashed line. Corresponding to this increase, the send levels up to this point of the first to third input channels "CH1" to "CH3" respectively indicated by the positions of white dashed lines in the channel level control sections 32a to 32c, which has been respectively set for the input channels "CH1" to "CH3", are collectively increased with the difference in levels among the input channels being maintained based on the recorded difference data. Accompanying this, the display positions of the knob parts 34 of the respective channel level control sections 32a, 32b, 32c of the input channels "CH1", "CH2", "CH3" are changed to correspond to the increased send levels. In this case, the send level of the input channel "CH2" which has been set as the master level becomes the maximum value, but the send levels of the input channels "CH1", "CH3" will not reach the maximum value. Since the master level cannot be increased any further, the upper limits of levels in all input channels belonging to the channel group Grp1 can be limited.

FIG. 6D is a diagram illustrating changes of send levels of the first to third input channels "CH1" to "CH3" belonging to the channel group Grp1 in the case where the knob part 34 of the group level control section 31a is touched and its position is moved downward to the minimum value. As illustrated in FIG. 6D, the master level of the channel group Grp1 becomes the minimum value from the position of a dashed line. In this case, since the master level is the minimum value, the send level of the input channel "CH2"

becomes the minimum value. Since the respective send levels are smaller than the master level in the input channels "CH1" and "CH3", the send levels respectively indicated by the positions of dashed lines in the channel level control sections 32a and 32c, which has been respectively set for the input channels "CH1" and "CH3", all become the minimum value. Accompanying this, the display positions of the knob parts 34 of the channel level control sections 32a, 32b, 32c of the input channels "CH1", "CH2", "CH3" become the lower end, corresponding to the send levels which become the minimum value. In this case, the master level being set to the send level of the input channel "CH2" and the recorded difference data are not updated, and the difference data prior to the operation are retained.

FIG. 6E is a diagram illustrating changes of send levels of the first to third input channels "CH1" to "CH3" belonging to the channel group Grp1 in the case where the knob part 34 of the group level control section 31a is touched and its position is moved upward in a state that the send levels of all input channels belonging to the channel group are set to the minimum value as illustrated in FIG. 6D. As illustrated in FIG. 6E, the master level of the channel group Grp1 increases from the minimum value. Corresponding to this increase, the send levels of the first to third input channels "CH1" to "CH3" which has been set to the minimum value are collectively increased with the difference in levels among the input channels being maintained based on the recorded difference data. Accompanying this, the display positions of the knob parts 34 of the channel level control sections 32a, 32b, 32c of the input channels "CH1", "CH2", "CH3" are changed to correspond to the increased send levels.

Thus, for example, when it is desired to mute the sounds of the channel group Grp1, it is just necessary to operate the knob par 34 of the group level control section 31a to the minimum value as in FIG. 6D. Further, when it is desired to hear the sounds of the channel group Grp1 again, it is just necessary to operate the knob par 34 of the group level control section 31a from the minimum value to a desired position as in FIG. 6E.

FIG. 7C illustrates a flowchart of processing executed by the CPU 40 when an upward movement operation on the knob part of the group level control section 31a is detected, so as to realize the above-described display and setting.

In the processing of FIG. 7C, the CPU 40 first determines whether the master level of the channel group Grp1 corresponding to the group level control section 31a is the maximum value or not (S31). When it is not the maximum value here, the CPU 40 increases the master level of the channel group Grp1 (S32). Then, moreover, based on the recorded difference data, the CPU 40 collectively increases the send levels of respective input channels belonging to the channel group Grp1 in correspondence with the increase of the master level with the difference in levels among the input channels being maintained (S33). Thereafter, the CPU 40 changes the display positions of the knob parts 34 to correspond to the respective levels after the change (S34), and ends the processing. When it is the maximum value in step S31, the processing is merely ended because the master level cannot be increased any further.

FIG. 7D illustrates a flowchart of processing executed by the CPU 40 when a downward movement operation on the knob part of the group level control section 31a is detected, so as to realize the above-described display and setting.

In the processing of FIG. 7D, the CPU 40 first determines whether the master level of the channel group Grp1 corresponding to the group level control section 31a is the minimum value or not (S41). When it is not the minimum value here, the CPU 40 decreases the master level of the channel group Grp1 (S42). Then, moreover, based on the recorded difference data, the CPU 40 collectively decreases the send levels of respective input channels belonging to the channel group Grp1 in correspondence with the decrease of the master level with the difference in levels among the input channels being maintained (S43). Thereafter, the CPU 40 changes the display positions of the knob parts 34 to correspond to the respective levels after the change (S44), and ends the processing. When it is the minimum value in step S41, the processing is merely ended because the master level cannot be decreased any further.

FIG. 6F is a diagram illustrating a change of send levels of the first to third input channels "CH1" to "CH3" belonging to the channel group Grp1 in the case the knob part 34 of the channel level control section 32a of the input channel "CH1" is touched and its position is moved upward. As illustrated in FIG. 6F, the send level indicated by the position of a white dashed line of the operated channel level control section 32a, which has been set for the input channel "CH1", is increased, but the send levels of the input channels "CH2" and "CH3" do not change, and also the master level does not change. Accompanying this, the display position of the knob part 34 of the channel level control section 32a of the input channel "CH1" is changed to correspond to the increased send level, but the display positions of the knob parts 34 of the channel level control sections 32b, 32c of the input channels "CH2", "CH3" and the group level control section 31a of the channel group Grp1 are maintained. Thus, when the position of the knob part 34 of a certain channel level control section 32 is operated, only the send level of the input channel corresponding to the operated channel level control section 32 is changed, and the send level of the input channel belonging to the channel group can be operated independently.

FIG. 6G is a diagram illustrating changes of send levels of the first to third input channels "CH1" to "CH3" belonging to the channel group Grp1 in the case where the knob part 34 of the channel level control section 32a of the input channel "CH1" is touched and its position is moved upward. As illustrated in FIG. 6G, when the send level indicated by the position of a white dashed line of the operated channel level control section 32a, which has been set for the input channel "CH1", is increased and exceeds the send level of the input channel "CH1" which has been the largest, it is determined that the send level of the input channel "CH1" has become the largest, and the master level is updated to the send level of the input channel "CH1". Then, the change of the largest send level being a trigger, the level control apparatus 2 calculates difference in levels between the send level of the input channel "CH1" which has become the largest and the send levels of other input channels "CH2" and "CH3" belonging to the same channel group, respectively, so as to update the recorded difference data. Accompanying this, the display positions of the knob parts 34 of the channel level control sections 32a of the input channel "CH1" and the group level control section 31a of the channel group Grp1 are changed to indicate the largest send level in correspondence with the increased send level, but the display positions of the knob parts 34 of the channel level control sections 32b, 32c of the input channels "CH2", "CH3" are maintained.

Note that any type (linear scale, dB (decibel) scale) of the send level value can be used in the above-described difference data. Further, the values to be displayed on the screen can be obtained by applying any conversion (table, function, or the like) to an actual level value (linear value, dB value, or the like).

FIG. 7E illustrates a flowchart of processing executed by the CPU 40 when an upward movement operation on the knob part of the channel level control section 32*a* is detected, so as to realize the above-described display and setting.

In the processing of FIG. 7E, the CPU 40 first determines whether the send level of the input channel "CH1" corresponding to the operated channel level control section 32*a* is the maximum value or not (S51). When it is not the maximum value here, the CPU 40 increases the send level of the input channel "CH1" (S52).

Next, the CPU 40 determines whether or not the send level of the input channel "CH1" has become largest among the send levels of respective input channels belonging to the channel group to which the input channel "CH1" belongs (here, the channel group Grp1) (S53). When it is Yes here, the CPU 40 changes the master level of the channel group Grp1 to which the input channel "CH1" belongs to the value of the send level of the input channel "CH1" after the change (largest value among the send levels of respective channels belonging to the channel group) (S54). Further, the CPU 40 records the input channel whose send level is the largest among the input channels belonging to the channel group to which the input channel "CH1" belongs and the difference in levels between the send level of this input channel and those of other input channels belonging to the channel group, as difference data (S55).

Thereafter, the CPU 40 changes the display positions of the knob parts 34 to correspond to the respective levels after the change (S56), and ends the processing.

When it is No in step S53, it is unnecessary to update the master level, and thus steps S54 and S55 are skipped to proceed to step S56. When it is the largest value in step S51, the processing is merely ended because the send level cannot be increased any further.

FIG. 7F illustrates a flowchart of processing executed by the CPU 40 when a downward movement operation on the knob part of the channel level control section 32*a* is detected, so as to realize the above-described display and setting.

In the processing of FIG. 7F, the CPU 40 first determines whether the send level of the input channel "CH1" corresponding to the operated channel level control section 32*a* is the minimum value or not (S61). When it is not the minimum value here, the CPU 40 decreases the send level of the input channel "CH1" (S62).

Next, the CPU 40 determines whether the largest send level among the send levels of the respective input channels belonging to the channel group to which the input channel "CH1" belongs has changed or not by the processing of step S62 (C63). When it is Yes here, the CPU 40 changes the master level in the channel group to which the input channel "CH1" belongs to the largest value among the send levels of the respective input channels belonging to this channel group (S64). Further, the CPU 40 records the input channel whose send level is the largest among the input channels belonging to the channel group to which the input channel "CH1" belongs and the difference in levels between the send level of this input channel and those of other input channels belonging to the channel group, as difference data (S65).

Thereafter, the CPU 40 changes the display positions of the knob parts 34 to correspond to the respective levels after the change (S66), and ends the processing.

When it is No in step S63, it is unnecessary to update the master level, and thus steps S64 and S65 are skipped to proceed to step S66. When it is the smallest value in step S61, the processing is merely ended because the send level cannot be decreased any further.

INDUSTRIAL APPLICABILITY

In the mixer having the above-described level control apparatus of an embodiment of the invention, the channel level control section 32 and a processor for realizing its function corresponds to a channel level controller provided for each channel with a control part for displaying an output level of a corresponding channel by a position of the control part. The group level control sections 31*a*, 31*b* and a processor for realizing its function corresponds to a group level controller provided with a control part for displaying a group level of a group constituted of a plurality of the channels by a position of the control part. A processor for controlling the display 46 to display the channel level control section 32 and the group level control sections 31*a*, 31*b* on the display 46 corresponds to a display controller for displaying the control part of the channel level controller for each channel and the control part of the group level controller, on a display.

The level control apparatus according to the invention has been described as a level control apparatus of a mixer but is not limited thereto, and for example, the level control apparatus can be one controlling illuminance levels of illuminations of an illumination apparatus having a plurality of illuminations. In this case, a group constituted of a plurality of illuminations is created, and balance adjustment of respective illuminance levels among a plurality of illuminations belonging to the group is performed. Then, by a group level control section correlated with the group, the illuminance levels can be collectively increased or decreased with a difference (balance) in illuminance levels among a plurality of illuminations belonging to the group being maintained.

In the above-described embodiment, the send levels to the AUX bus 12 from the input channels 10 belonging to the channel group are collectively increased or decreased, by the group level control section 31*a*, 31*b*, with the difference in levels among the input channels 10 being maintained. However, instead of the send levels, the levels of faders 24 of the input channels 10 belonging to the group may be collectively increased or decreased with the difference in levels among the input channels 10 being maintained. Alternatively, a group constituted of output channels 14 may be created, and the output levels of the output channels 14 belonging to the group may be collectively increased or decreased with difference in levels thereof being maintained by the group level control section 31*a*, 31*b*.

Further, since the level control apparatus of the above described embodiment has the touch panel display, the above-described movement operation of the knob part 34 of the group level control section 31*a*, 31*b* or the channel level control section 32 and tap operation on each part can be accepted as touching on the touch panel display. However, a dedicated controls may be provided in the surrounding of the touch panel display, and the above-described operations may be accepted on the controls.

REFERENCE SIGNS LIST

1 . . . MIX unit, 2 . . . level control apparatus, 10, 10-1 to 10-*n* . . . input channel, 11 . . . group master, 12 . . . AUX bus, 13 ... ST bus, 14-1 to 14-*m* ... output channel, 15 ... stereo output channel, 21 ... head amplifier, 22 ... equalizer, 23 ... compressor, 24 ... fader, 25 ... pan, 26 ... send, 30 ... basic screen, 30' ... group expansion screen, 31*a*, 31*b* ... group level control section, 32, 32*a* to 32*c* ... channel level control section, 33 ... AUX level control section, 34 ... knob part, 35 ... name plate, 40 ... CPU, 41 ... ROM, 42 ... RAM, 43 ... communication I/F, 45 ... control, 46 ... display, 47 ... bus.

The invention claimed is:

1. A level control apparatus comprising:
a channel level controller provided for each channel with a control part for displaying an output level of a corresponding channel by a position of the control part;
a group level controller provided with a control part for displaying a group level of a group constituted of a plurality of the channels by a position of the control part; and
a calculator for calculating difference among the output levels of the plurality of channels belonging to the group,
wherein the group level controller selects a largest output level among output levels of the plurality of the channels belonging to the group as the group level,
the channel level controller controls, according to an operation of the control part of the channel level controller, the output level of the channel corresponding to the channel level controller, and
the group level controller collectively controls, according to an operation of the control part of the group level controller, output levels of the plurality of the channels belonging to the group with the difference of the output levels among the channels calculated by the calculator being maintained.

2. The level control apparatus according to claim 1, further comprising
a display controller for displaying the control part of the channel level controller for each channel and the control part of the group level controller, on a display,
wherein the channel level controller controls the output level according to the operation of the control part of the channel level controller displayed on the display, and
the group level controller collectively controls the output levels according to the operation of the control part of the group level controller displayed on the display.

3. The level control apparatus according to claim 1,
wherein when the control part of the group level controller is operated in a direction to increase the group level, the group level controller controls the output levels of the plurality of the channels belonging to the group in an increasing direction until the group level reaches a maximum value, with the difference of the output levels among the channels calculated by the calculator being maintained.

4. The level control apparatus according to claim 1,
wherein when the control part of the group level controller is operated in a direction to decrease the group level and the group level reaches a minimum value, the group level controller controls the output levels of the plurality of the channels belonging to the group to be the minimum level, and retains information of the difference calculated by the calculator before the operation.

5. The level control apparatus according to claim 4,
wherein when the control part of the group level controller in which the group level is controlled to be the minimum value is operated in the direction to increase the group level, the group level controller controls the output levels of the plurality of the channels belonging to the group in an increasing direction, with the retained difference of the output levels among the channels being maintained.

6. The level control apparatus according to claim 1,
wherein when the control part of the channel level controller is operated and, according to the operation, the output level of one channel exceeds the largest output level among the plurality of the channels belonging to the group, the group level controller replaces the group level with the output level of the one channel.

7. The level control apparatus according to claim 2,
wherein when the control part of the group level controller is operated in a direction to increase the group level, the group level controller controls the output levels of the plurality of the channels belonging to the group in an increasing direction until the group level reaches a maximum value, with the difference of the output levels among the channels calculated by the calculator being maintained.

8. The level control apparatus according to claim 2,
wherein when the control part of the group level controller is operated in a direction to decrease the group level and the group level reaches a minimum value, the group level controller controls the output levels of the plurality of the channels belonging to the group to be the minimum level, and retains information of the difference calculated by the calculator before the operation.

9. The level control apparatus according to claim 8,
wherein when the control part of the group level controller in which the group level is controlled to be the minimum value is operated in the direction to increase the group level, the group level controller controls the output levels of the plurality of the channels belonging to the group in an increasing direction, with the retained difference of the output levels among the channels being maintained.

10. The level control apparatus according to claim 2,
wherein when the control part of the channel level controller displayed on the display is operated and, according to the operation, the output level of one channel exceeds the largest output level among the plurality of the channels belonging to the group, the group level controller replaces the group level with the output level of the one channel.

11. A non-transitory machine-readable storage medium containing program instructions executable by a computer and enabling the computer to execute a process comprising:
displaying, with a control part of a channel level controller provided for each channel, an output level of a corresponding channel by a position of the control part;
displaying, with a control part of a group level controller, a group level of a group constituted of a plurality of the channels by a position of the control part;
calculating difference among the output levels of the plurality of channels belonging to the group; and
selecting a largest output level among output levels of the plurality of the channels belonging to the group as the group level, controlling, according to an operation of the control part of the channel level controller, the output level of the channel corresponding to the channel level controller, and collectively controlling, according to an operation of the control part of the group level controller, output levels of the plurality of the channels belonging to the group with the difference of the output levels among the channels calculated in the calculating being maintained.

12. The non-transitory machine-readable storage medium according to claim 11, wherein the computer comprises a display, the output level of the corresponding channel is displayed on the display, in the displaying, the group level of the group constituted of the plurality of the channels is displayed on the display, in the displaying, the output level of the channel corresponding to the channel level controller is controlled according to the operation of the control part of the channel level controller displayed on the display, in the controlling, and the output levels of the plurality of the channels belonging to the group is collectively controlled according to the operation of the control part of the group level controller displayed on the display, in the controlling.

\* \* \* \* \*